United States Patent [19]

Breneman et al.

[11] Patent Number: 5,136,630
[45] Date of Patent: Aug. 4, 1992

[54] INTRINSICALLY SAFE TELEPHONE

[75] Inventors: Brian H. Breneman, Reading; Bruce Dale, Robesonia, both of Pa.

[73] Assignee: Gai-Tronics, Reading, Pa.

[21] Appl. No.: 553,538

[22] Filed: Jul. 13, 1990

[51] Int. Cl.$^5$ .............................................. H04M 9/04
[52] U.S. Cl. ...................................... 379/64; 379/65; 379/387; 379/391
[58] Field of Search ................... 379/64, 65, 164, 175, 379/167, 176, 391, 387, 375, 410, 412

[56] References Cited

U.S. PATENT DOCUMENTS

| 3,997,733 | 12/1976 | Sanders | 379/176 |
| 4,064,366 | 12/1977 | Wheatley et al. | 379/387 |
| 4,214,127 | 7/1980 | Oules | 379/395 |
| 4,741,031 | 4/1988 | Grandstaff | 379/391 |
| 4,821,319 | 4/1989 | Middleton et al. | 379/167 |
| 4,847,888 | 7/1989 | Cox et al. | 379/64 |

Primary Examiner—James L. Dwyer
Assistant Examiner—Dwayne D. Bost
Attorney, Agent, or Firm—Woodcock Washburn Kurtz Mackiewicz & Norris

[57] ABSTRACT

An intrinsically safe telephone as provided for use in hazardous areas. The telephone includes a single line instrument located in the hazardous area which, in turn, is coupled by a two-wire transmission path to a shunt diode barrier and a telephone line interface located in a safe environment. The telephone line interface reduces power of incoming ringing and audio signals. The telephone line interface further includes an off-hook indicating circuit which senses when the single line instrument is off-hook. The intrinsically safe telephone is useful in all hazardous environments as classified by the National Electrical Code and requires no explosion-proof housing.

13 Claims, 6 Drawing Sheets

INTRINSICALLY SAFE TELEPHONE

The present invention is directed to an intrinsically safe telephone for use in hazardous areas or in areas in which safety is a major consideration and, in particular, is directed to an intrinsically safe telephone that is useful in such areas and that does not require the use of an expensive explosion-proof housing of the type required by the prior art.

BACKGROUND OF THE INVENTION

A wide range of industries such as, for example, electric utilities, power plants, oil refineries, off shore oil rigs, gas ethylene companies, chemical plants, coal mining operations, coal prep plants and transfer stations, gas pipelines, plastic manufacturers, granaries, etc. present very hazardous environments in which electrical equipment must be used. Because of these dangerous environments and because of the hazards imposed by the use of electrical equipment in them, various standards have been imposed by the National Electrical Code and by Underwriters Laboratories for the design of electrical equipment for hazardous areas.

The National Electrical Code (NEC) classifies hazardous areas in industrial environments depending upon the properties of the materials found in those environments. (See ANSI/NFPA-70 Article 500.) Class 1 hazardous environments are those containing inflammable gases and vapors. Class 2 hazardous areas are those containing inflammable dusts. Class 3 hazardous areas are those containing fibers and flyinqs. Within each of the aforementioned classes, environments are further grouped in accordance with the particular materials found there. Class 1, Group A, environments are those which include acetylene gas. For example, Class 1, Group A, environments are the most hazardous environments classified by the NEC and these require the most stringent specifications for electrical equipment. Because of the nature of acetylene gas, very little electrical equipment has ever been approved for use in Class 1, Group A, environments.

Class 1, Group B, environments are those including hydrogen gas or manufactured gases containing more than 30% hydrogen by volume. Class 1, Group C, environments are those containing carbon monoxide, hydrogen sulfide, crude oil, etc. Class 1, Group D, environments are those containing acetone, benzine, butyl, ethyl, methyl, propyl and isopropyl alcohols, gasoline, methane, styrene, toluene, vinyl chloride, etc. Telephone equipment has been approved for use in Class 1, Group B, C and D, environments but such equipment is very expensive.

Electrical equipment, including telephones, which is approved for use in Class 1 hazardous areas as classified by the NEC, without the use of approved enclosures, i.e., explosion-proof, purged and pressurized, is referred to as "intrinsically safe". Typical prior art explosion-proof telephones approved for use in Class 1, Groups B, C and D type hazardous environments have enclosures which are not air tight. The enclosures for such explosion-proof telephones, therefore, allow the entry of the surrounding hazardous atmosphere. Any arcing of the device within its enclosure can, therefore, cause ignition inside the enclosure. The enclosure must therefore be constructed to withstand and contain the resulting high pressures caused by the internal explosion. Such enclosures usually include heavy aluminum castings with wide, closely machined cover plates secured in place by many hold down bolts. Any pass through devices through the enclosure, such as push buttons or rotary motion switches, must also maintain certain clearances with a minimum length bushing or sleeve. Such enclosures are heavy and expensive to construct.

It would be desirable to provide a hazardous area telephone for use in Class 1, Group B, C and D, type hazardous environments as classified by the National Electrical Code which did not require the use of an explosion-proof housing of the type described above. It would be further desirable to provide an intrinsically safe telephone for use in Class 1, Group A, environments and it would be even more desirable to produce such a telephone which did not require an explosion-proof housing.

The design of an intrinsically safe telephone which meets Underwriter Laboratories (UL) requirements for installation in hazardous environments of the type classified by the National Electrical Code is not a simple matter.

In addition to meeting the constraints imposed by Underwriters Laboratories, it is also required that an intrinsically safe telephone meet the requirements of the Federal Communications Commission for interface with standard telephone networks. Thus, while an intrinsically safe telephone meeting the object of the present invention must meet the requirements of the NEC and of the Underwriters Laboratories for hazardous environments, it must also have standard line impedances and characteristics in order to interface with pre-existing telephone networks.

One type of prior art intrinsically safe telephone is disclosed in U.S. Pat. No. 4,741,031 by Larry P. Grandstaff entitled "Intrinsically Safe Telephone" and assigned to the assignee of the instant application. The contents of this patent are incorporated herein insofar as it is necessary for a full understanding of the present invention. The intrinsically safe telephone of the Grandstaff patent includes a line powered single line instrument, an off-hook circuit for indicating that the single line instrument is off-hook, and a bootstrap power supply for driving the off-hook circuit. The bootstrap power supply draws and stores line power while the single line instrument is in an on-hook condition and uses the stored power to initialize itself in the off-hook condition. The telephone disclosed and claimed in the Grandstaff patent was a significant advance.

Following introduction of the telephone of the Grandstaff patent, however, certain telephone companies have refused to supply service to a single line instrument that draws line power in an on-hook condition. Some telephone companies employ a periodic sweep of their circuits looking for faults. A high resistance short caused by the bootstrap power supply of the Grandstaff patent may appear to the telephone company as such a fault, though, in fact, it is not.

Furthermore, because of objections from such telephone companies, the Federal Communications Commission has indicated an unwillingness to approve any Z class single line instrument, i.e. a single line instrument that has an on-hook impedance less than five megohm. Because of its bootstrap power supply, the line powered single line instrument of the Grandstaff patent is such an instrument. Thus, the line-powered product disclosed in the Grandstaff patent, while a technical advance, has not been widely adopted.

For the foregoing reasons, there is a need to provide an intrinsically safe telephone that does not draw line power in an on-hook condition.

One other limitation of the intrinsically safe telephone disclosed in the Grandstaff patent relates to its sidetone characteristics, i.e., it exhibits sidetones that are higher than those found in a typical telephone. The sidetone of a telephone is the acoustic signal resulting from a portion of the transmitted signal being coupled, within the telephone, to the receiver of the same handset. Some sidetone is required such that a caller may hear his own voice in the earpiece when speaking into the microphone of the telephone. If the amount of sidetone provided is too low, the caller has a tendency to unduly raise his voice when speaking. If the sidetone is too high, the caller speaks too softly. In a telephone designed for use in normal environments, there is an optimum amount of sidetone which is on the order of −12 db. In a telephone designed for use in noise environments, such as factories, mines and other locations in which the telephone of the Grandstaff patent is desirable for use, it is desired that a caller speak more loudly than in a normal environment. For this reason, in noisy environments even less than normal sidetone should be provided. In the noisy, hazardous environments in which an intrinsically safe telephone would be used, it would be desirable to provide between −12 and −14 db of sidetone.

The Grandstaff patent discloses an intrinsically safe telephone, however, in which the amount of sidetone provided is on the order of −5 db; an amount unsuitably high for environments with high ambient noise. Two conceivable methods of reducing the sidetone of the telephone of the Grandstaff patent would be to either employ additional passive, capacitive components in the hazardous environment, thus increasing the overall capacitance in the hazardous environment, or employing additional active components drawing current in the hazardous environment thus increasing the power required. The provision of additional capacitance or current drawing components in the single line instrument of the Grandstaff patent would cause it to be unsafe in a hazardous environment and thus, cease to be intrinsically safe. Another possible mechanism to reduce the sidetone would be to isolate the outgoing audio signal from the reflected sidetone signal by use of two separate two-wire paths from the hazardous to the safe environment. Such an approach, however, would also increase capacitance due to the presence of added wiring and would result in additional limitations regarding the maximum safe distance that the handset could be displaced from the safe environment.

For these latter reasons, there is a need to provide a telephone with reduced sidetone but which maintains intrinsic safety and without employment of two separate, physical two-wire paths.

Still another limitation that has arisen in practice with the intrinsically safe telephone disclosed in the Grandstaff patent relates to the off-hook detection circuit mentioned above. The telephone disclosed in the Grandstaff patent includes a telephone line interface located in a safe environment with a single line instrument located in the hazardous environment. The off-hook indicator circuit is provided in the telephone line interface and, in operation, that circuit detects a change in loop current which, in turn, indicates that the handset is off-hook. Because the single line instrument is located in a hazardous environment there are severe constraints regarding the permissible amplitude of the voltage input to the single line instrument and magnitude of current output from the single line instrument. Moreover, there is often a long distance between the telephone line interface and the single line instrument, reaching distances, for example, of up to one mile or more. For this reason, the line resistance may be quite high. Given these constraints, it is difficult to detect the change in loop current signifying an off-hook condition. This is especially so in the presence of incoming ringing signals which tend to mask the loop current change. With the telephone of the Grandstaff patent, a call recipient could take the phone off-hook in response to an incoming ring signal but that off-hook condition could remain undetected by the off-hook indicator circuit in the telephone line interface during an incoming ring signal. In this situation, when the call recipient placed the telephone receiver to the recipient's ear, the telephone would continue to ring. Such a condition, in practice, is undesirable.

Possible techniques for increasing the sensitivity of the off-hook detection capability of the Grandstaff telephone might be thought to include decreasing input ring voltage to or increasing output current from the single line instrument. Increasing the output current, however, would have the effect of increasing the spark potential of the single line instrument and thereby destroying its intrinsic safety. Decreasing the input ring voltage, on the other hand, would have the undesirable effect of making the ring signal less audible in a noisy environment.

Still another limitation of the Grandstaff telephone resides in the fact that the audible ring is sometimes not loud enough in particularly noisy environments such that call recipients are unable to detect the fact that the phone is ringing. A possible solution to such a condition would be to employ a louder ringing transducer. Such transducers, however, have increased capacitance to that employed in the Grandstaff patent. Such increased capacitance would destroy the intrinsic safety of the telephone.

From the foregoing it will be understood that there is a need to provide an intrinsically safe telephone having an increased off-hook detection capability without comprising its intrinsic safety.

Accordingly, it is an object of the present invention to provide an intrinsically safe telephone which is capable of operating in all hazardous environments as defined by the National Electrical Code, which does so without the use of an expensive explosion-proof housing, which meets all of the requirements of Underwriter's Laboratories for operation within hazardous environments and which is fully compatible with pre-existing telephone networks.

It is still a further object of the present invention to provide a louder audible ring without compromising intrinsic safety.

It is still further an object of the present invention to provide an intrinsically safe telephone in response to, and in satisfaction of, the aforementioned needs which does not draw line power in an on-hook condition, which has reduced sidetone, which has an increased off-hook detection capability, and which has a louder audible ring, all while maintaining, and without compromising, the intrinsic safety of the telephone.

SUMMARY OF THE INVENTION

These and other objects of the present invention are achieved by an intrinsically safe telephone which includes a single line instrument. The single line instrument is located in a hazardous environment and is coupled via a transmission path (preferably two-wire) to a safe environment. Located in the safe environment is an electrical isolation means which includes a telephone line interface and a shunt diode barrier for reducing and controlling maximum power to the single line instrument. The telephone line interface reduces line power from the network to the single line instrument and also reduces the power of incoming ringing signals from the network so as to comply with the requirements of Underwriters Laboratories. The single line instrument provides dialing and audio output signals to the network and receives ringing and audio input signals from the network. The single line instrument is fully compatible with the network and yet is isolated from it.

In accordance with an important aspect of the present invention, telephone line interface includes a local power interface for supplying power to the single line instrument over the transmission path. Because local power, rather than line power is employed, there is no need for a bootstrap power supply that appears as a fault to the telephone company during an on-hook condition.

In accordance with another aspect of the invention, the intrinsically safe telephone further includes a transmitter for generating a carrier signal for transmission over the transmission path, the audio output signal being modulated on the carrier signal. The telephone line interface includes a receiver, responsive to the carrier, for providing a demodulated audio output signal to the network and a sidetone generator, responsive to the demodulated audio output signal, for providing a phase adjusted feedback signal over the transmission path to the signal line instrument. The use of the foregoing scheme permits a reduction in sidetone without the use of additional capacitive or active components in the hazardous environment that might compromise intrinsic safety. The scheme further permits the use of a piezoelement having a higher capacitance in the hazardous environment. Such a piezoelement provides a louder audible ring indication then permitted in the phone of the Grandstaff patent and, yet, intrinsic safety is not compromised.

In accordance with still another aspect of the present invention the telephone line interface further includes an off-hook detector responsive to changes in loop current in the transmission path; a network interface responsive to a ringing input signal from the network having a defined ring interval; a ring generator for applying a local periodic ring signal to the transmission path during the ring interval. In accordance with this aspect of the invention the local periodic ring signal includes active portions interrupted by relatively quiescent portions over each period of the signal. Control means are provided responsive to the off-hook detector for generating an off-hook signal whenever a change in loop current has been detected during the quiescent portions of the periodic ring signal. The ring generator is responsive to this off-hook signal to preclude further ringing of the single line instrument when the receiver is taken off-hook. Because of the fact that the off-hook signal is detected during relatively quiescent periods of the local periodic ring signal, it is possible to determine that the handset is off-hook even during the period that the phone is ringing.

BRIEF DESCRIPTION OF THE DRAWINGS

The present invention will be more fully understood by reference to the accompanying drawings in which.

DETAILED DESCRIPTION OF THE PREFERRED EMBODIMENT

Figure 1:
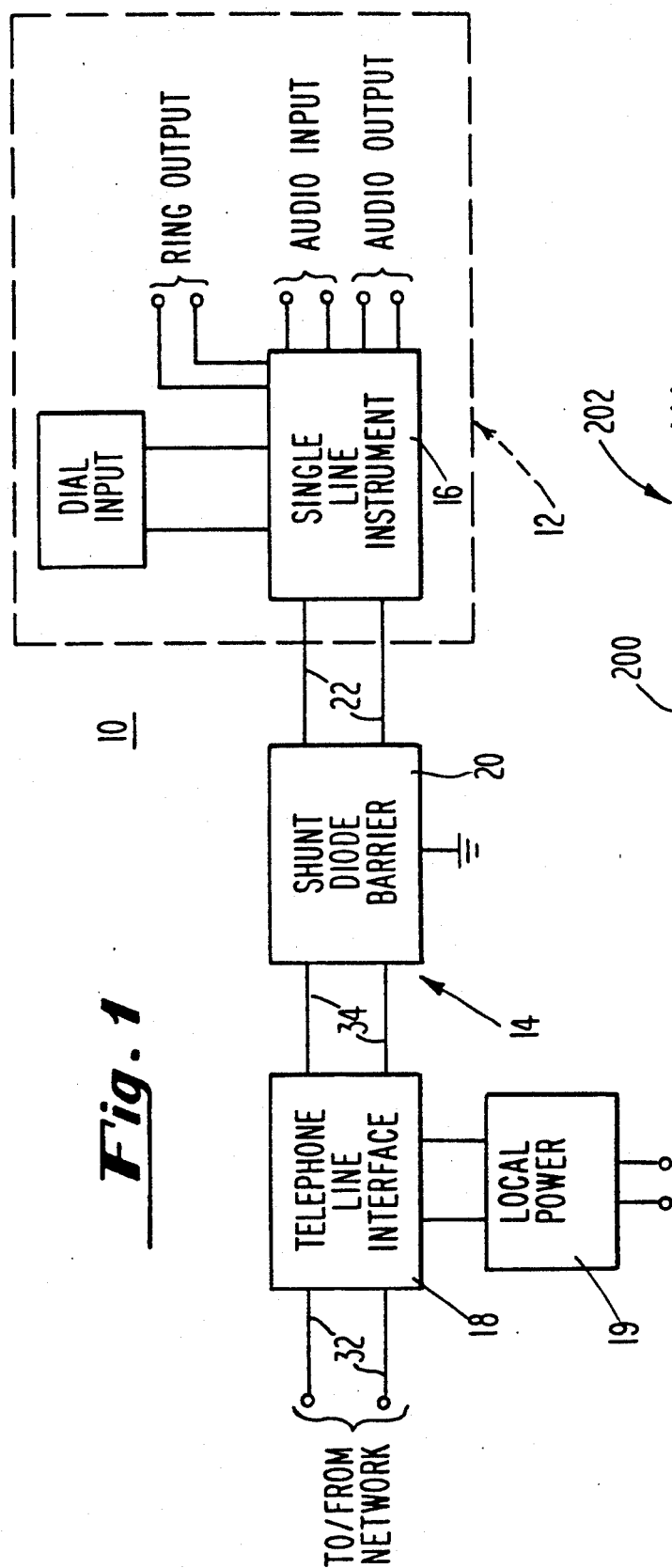
FIG. 1 is a general schematic block diagram of the intrinsically safe telephone system of the present invention.

Referring first to FIG. 1, the intrinsically safe telephone system of the present invention is shown generally at 10. The intrinsically safe telephone system 10 of the present invention includes one portion located in a hazardous environment 12 and another portion located in a safe environment shown generally at 14. The intrinsically safe telephone system includes a single line instrument 16 which is located in the hazardous environment 12. The single line instrument 16 is capable of receiving audio input signals and ringing input signals from a telephone network and is also capable of providing an audio output signal and a dialing output signal to that network. The single line instrument 16 is connected to a standard telephone network through an electrical isolation barrier. The electrical isolation barrier is located in the safe environment 14 which is remote from the single line instrument 16. The electrical isolation barrier, in accordance with the present invention, includes a telephone line interface circuit 18 and a shunt diode barrier 20. Operatively coupled to the telephone line interface unit 18 is a local power interface 19.

The telephone line interface 18 is coupled to the telephone network through lines 32. The telephone line interface 18 reduces power of incoming ringing signals from the network in a manner to be describe below and isolates the single line instrument 16 from the network. The shunt diode barrier 20 is connected to the telephone line interface 18 by lines 34 and is also connected to earth ground. The shunt diode barrier 20 is further connected to the single line instrument 16 by means of a transmission path 22 which provides both power to, and communication with, the single line instrument 16. In accordance with the preferred embodiment, the transmission path is a two wire path. The shunt diode barrier 20 provides current and voltage protection to the single line instrument 16 located within the hazardous environment 12.

Insofar as the telephone network is concerned, the telephone line interface 18 of the present invention provides the requisite impedance and line characteristics to satisfy the requirements of the Federal Communications Commission. Insofar as the single line instrument is concerned, the telephone line interface 18 further provides, however, voltage and current characteristics sufficient to meet the most stringent requirements of operation in hazardous environments as required by the National Electrical Code.

Figure 2:
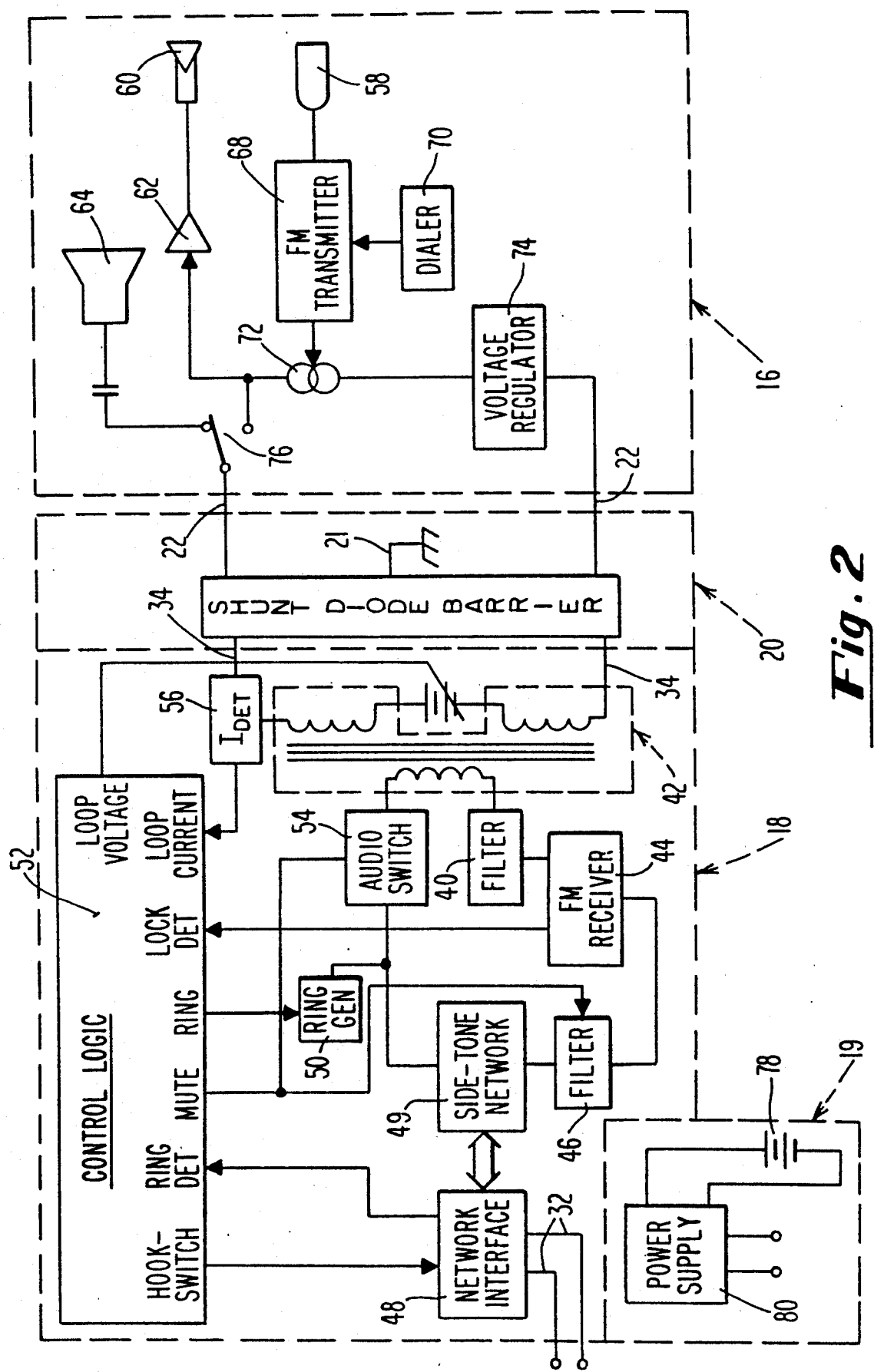
FIG. 2 is a more detailed schematic block diagram of th intrinsically safe telephone system of the present invention showing details of the telephone line interface, the local power interface, the shunt diode barrier and the single line instrument.

Referring now to FIG. 2, each of the major components of the intrinsically safe telephone system 10 of the present invention will be described in further detail. In particular, the major sub-components of the telephone line interface 18, the shunt diode barrier 20, the single line instrument 16 and the local power interface 19 are shown.

TELEPHONE LINE INTERFACE

As shown in FIG. 2, the telephone line interface 18 includes a network interface circuit 48 that receives audio and ringing input signals from the telephone network via input lines 32. The network interface circuit 48 is responsive to the ringing input signals from the network. The ringing input signals have a defined ring interval and are typically signals of 90–150 volts. The network interface circuit generates a ring detect signal whenever such a ringing input signal from the network is received.

The telephone interface 18 further includes a sidetone network 49 operatively coupled thereto. The sidetone network 49 provides a phase adjusted feedback signal to the single line instrument 16 in a manner to be described below. The telephone line interface 18 further includes a ring generator 50 for generating a local periodic ring signal to the transmission path during the ring interval as will be more fully explained below. The telephone line interface 18 also includes an audio switch 54 connected between the sidetone network 49 and the ring generator 50 on the one hand and the primary coils of an interface transformer 42 on the other hand. The secondary coils of the interface transformer 42 are coupled to the shunt diode barrier 20 via output lines 34. As will be more fully explained below, the telephone line interface 18 provides electrical isolation separating the input lines 32 from the output lines 34.

As shown in FIG. 2, the telephone line interface 18 further includes an FM receiver filter 40 coupled between the interface transformer 42 and an FM receiver 44. The FM receiver 44 is responsive to an FM signal generated at the single line instrument 16. The demodulated audio output from the FM receiver 44 is coupled through a band pass filter 46 to the sidetone network 49. The sidetone network 49 is responsive to the demodulated audio output signal from the FM receiver 44 to provide the aforementioned phase adjusted feedback signal that is used to provide sidetone at the single line instrument 16. The telephone line interface 18 further includes an off-hook detector circuit 56 coupled to output lines 34. The off-hook detector circuit 56 is responsive to changes in loop current in the transmission path 22 that indicate an off-hook condition at the single line instrument 16.

Finally, as shown in FIG. 2, the telephone line interface 18 includes control logic 52 that receives the ring detect signal input from the network interface 48, off-hook inputs from the off-hook detector 56 and lock detect inputs form the FM receiver 44. Under appropriate conditions the control logic 52 provides a hook switch output signal to the network interface 48, a mute signal to the band pass filter 46 and to the audio switch 54 and a command signal to the ring generator 50.

SHUNT DIODE BARRIER

As shown in FIG. 2, the shunt diode barrier 20 is coupled across the secondary of the interface transformer 42 of the telephone line interface by lines 34 and is coupled to the single line instrument 16 by transmission path 22. The shunt diode barrier is connected to earth ground at 21. The shunt diode barrier 20 provides essential current and voltage protection to the single line instrument 16.

SINGLE LINE INSTRUMENT

As shown in FIG. 2, the single line instrument 16 includes a microphone 58 and an earpiece 60. Incoming audio signals from the transmission path 22 are applied to the earpiece 60 by means of an earpiece amplifier 62 depending upon the position of the hook switch 76. As shown in FIG. 2 the hook switch 76 is in the on-hook position such that no audio input signals may be applied to the earpiece. Instead, the hook switch 76 is coupled to a piezoelectric element 64 that provides an audible ring indication when an incoming call is to be received.

In accordance with the present invention the microphone 58 of the single line instrument is coupled to an FM transmitter 68 which generates a carrier signal and provides a modulated audio signal for transmission across the transmission path 22 to the telephone line interface 18. The FM transmitter 68 is further coupled to a dialer 70 and receives dialing inputs therefrom. Finally, the single line instrument 16 includes a constant current source 72 and a voltage regulator 74 connected across the transmission path 22, the output of the FM transmitter being connected to the constant current source 22.

LOCAL POWER INTERFACE

As shown in FIG. 2, the local power interface includes a battery back-up 78 and a power supply 80 that provides power from a source other than the telephone network itself, i.e. from a source at the local site, to the telephone line interface 18 and, in turn, to the single line instrument 16 when the instrument is off hook. Power is supplied from the power supply 80 of the local power interface 19 to the active components of the single line instrument 16 across lines 22. For the sake of clarity the actual power connections between the power supply 80 of the local power interface 19 and the active components of the telephone line interface 18 are not shown.

Figure 3A:
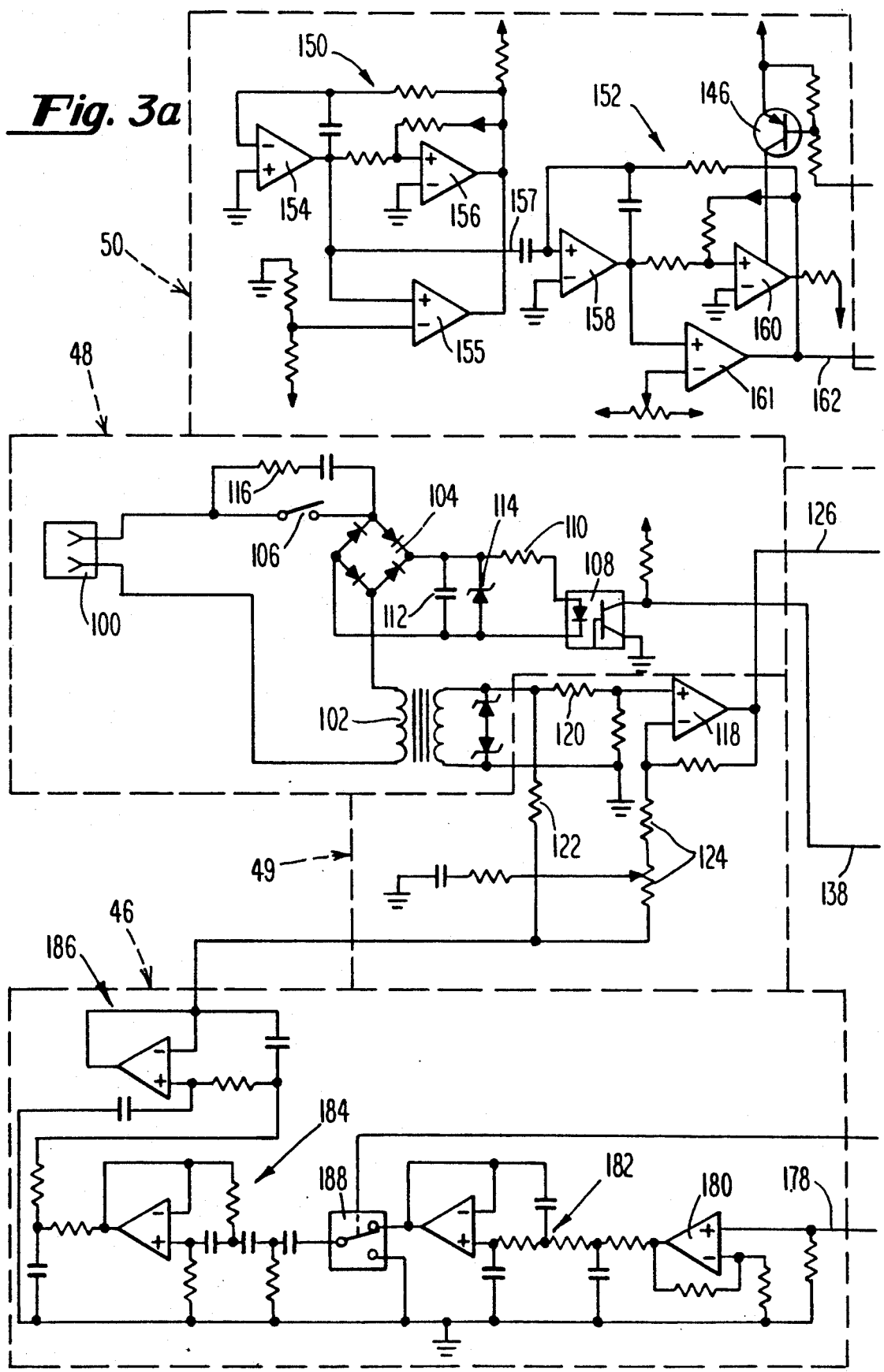
FIGS. 3a and 3b is a detailed circuit diagram of the telephone line interface shown in FIG. 1.
Figure 3B:
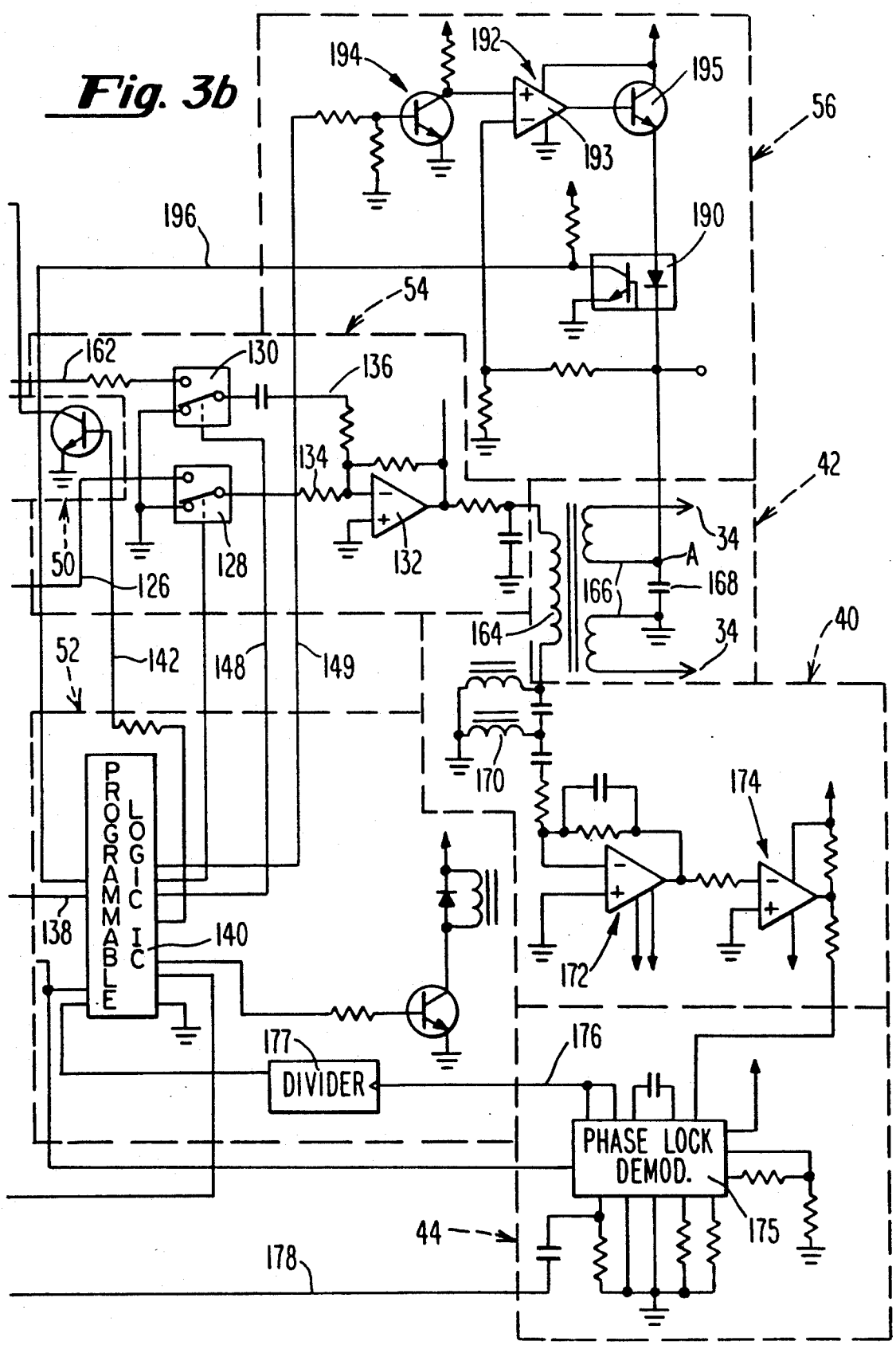

Referring now to FIGS. 3a and 3b, the individual circuit components of the telephone line interface 18 will be further described. The network interface 48 is coupled to the telephone network at terminals 100. The network interface 48 includes an isolation transformer 102 that provides an audio path as well as high voltage isolation. The network interface 48 further includes a bridge rectifier 104 and a hook switch 106. The hook switch operates under the control of control means 52 in a manner to be described below. When the single line instrument 16 is on-hook, the hook switch 106 is open. Incoming ring signals from terminals 100 are directed around hook switch 106 through RC network 116 to the bridge rectifier 104. The DC output of the bridge rectifier 104 is directed to an opto coupler 108 through a current limiting resistor 110. Voltage protection to the opto coupler 108 is provided by means of capacitor 112 and zener diode 114 coupled across the opto coupler 108. When a ring signal is received, the DC output from bridge rectifier 104 causes opto coupler 108 to conduct and to generate a ring detect signal for transmission to the control means 52 on line 138.

The primary of the isolation transformer 102 is also connected to the bridge rectifier 104 and to terminals 100. The secondary of the isolation transformer 102 interfaces with sidetone network 49. Thus, incoming and outgoing audio signals are directed across isolation transformer 102 to the sidetone network 49. The sidetone network 49 includes a differential amplifier 118. Incoming audio signals from the network are directed to the amplifier 118 through resistor 120 coupled between the secondary of transformer 102 and the noninverting input of amplifier 118. Outgoing audio signals from the single line instrument are directed to the sidetone network 49 through resistor 122 and to the secondary of transformer 102. A portion of the outgoing audio signal is coupled to the inverting input of the amplifier 118 through resistors 124.

The audio signal from the sidetone network 49 is directed to the audio switch 54 via line 126. The audio switch includes a first switch 128 to which the audio signal is directed, and a second switch 130 that is coupled to the ring generator 50 in a manner described below. The outputs of first and second switches 128 and 130 are directed to an inverting amplifier 132 by means of resistors 134 and 136 respectively. The output of the inverting amplifier 132 is directed to the interface transformer 42. When the single line instrument is off-hook, switch 128 is in the opposite position to that shown in FIGS. 3a and 3b, thus passing the audio signal to the inverting amplifier 132. When the telephone is on-hook, and a ring is detected, the switch 130 is caused to change to the opposite position to that shown in FIGS. 3a and 3b and a ring signal is passed to the inverting amplifier 132 from the ring generator 50.

While the audio output of the sidetone network 49 is directed via line 126 to the audio switch 54, the output of the opto coupler 108 is directed via line 138 to the control means 52 for the purpose of determining when a ringing input signal has been received from the telephone network. The control means comprises a programmable logic IC 140. The control means 52 is connected to the ring generator 50 via line 142 and to the audio switch 54 via line 148.

When a ringing input signal is received at the network interface 48 a ring detect signal is present on line 138. The control means 52 generates a first signal on line 142 to the ring generator 50 and a second signal on line 148 to the audio switch 148. The ring generator includes, among other things, transistor 146. Line 142 couples the programmable logic 140 146. Transistor 146 provides power to the ring generator 50 for generating a ring signal. Line 148 connects the programmable logic 140 with switch 130. When a signal is present on line 148, switch 130 gates the ring signal from the ring generator 50 to the inverting amplifier 132.

The ring generator 50 generates a ring signal comprising a varying audio frequency signal for exciting the piezoelement of the single line instrument. In addition to the transistors 144 and 146 mentioned above, the ring generator 50 comprises two oscillator circuits 150 and 152. The first oscillator 150 includes amplifiers 154, 155 and 156 that generate a 20 hz sawtooth waveform on line 157 to the second oscillator 152. The second oscillator 152 includes amplifiers 158, 160 and 161 that generate the aforementioned ring signal on line 162. That ring signal ranges approximately between 2K and 3K hz.

When a ringing input signal is received from the network and a ring detect signal is present on line 138, the control logic 52 provides power to the ring generator 50 by means of transistors 144 and 146. When so energized the ring generator 50 produces the varying audio frequency ring signal mentioned above on line 162. At the same time, the control means 52 alternately opens and closes the switch 130 such that the ring signal is applied to the inverting amplifier 132 in a discontinuous manner. The ring signal is thus transmitted to the single line instrument in a manner such that it includes relatively active portions and relatively quiescent portions for reasons to be described further below.

The interface transformer 42 couples the telephone audio switch 54 to the shunt diode barrier 20. The interface transformer 42 includes a primary coil 164 and split secondary coils 166. The secondary coils 164 are connected to lines 34 that, in turn, are directed to the shunt diode barrier. The secondary coils 164 include a low pass filter comprised of capacitor 168 connected to ground. The primary coil 164 of the interface transformer 42 is driven by the inverting amplifier 132 of the audio switch 54 such that ring signals and audio signals are transmitted to the shunt diode barrier 20.

Incoming signals from the single line instrument are received at the interface transformer 42. Such incoming signals are directed from the primary 164 to the FM receiver filter 40. The FM receiver filter 40 includes a high pass filter consisting of a four pole LC circuit 170, a low pass filter consisting of an amplifier 172, and a level comparator 174. The level comparator 174 provides a square wave carrier signal that is directed to the FM receiver demodulator 44.

The FM receiver demodulator 44 comprises a phase locked loop demodulator 175, such as the Model 4046 manufactured by RCA and others. The outputs of the FM receiver demodulator 44 are directed via a first line 176 to the control means 52 and by a second line 178 to the band pass filter 46. The output of the demodulator 175 on line 176 is a phase locked carrier signal that is directed to the divider 177. The output of the divider 177 is directed to the control means 52 for timing purposes. The output of the demodulator 175 on line 178 is a demodulated signal from the single line instrument that may comprise either audio or dialing signals.

The bandpass filter 46 comprises a series of amplifiers 180, 182, 184, and 186 as well as switch 188. Amplifier 180 provides gain. Amplifiers 182 and 186 are low pass filters. Amplifier 184 is a high pass filter. The bandpass filter 46 rejects signals outside normal voice frequencies, i.e. outside the range 300 to 3000 hz, as required by regulatory agencies. The switch 188 is controlled by control means 52. The switch passes signals to the telephone network when in the position shown. When switch 188 is in the position opposite to that shown, no signals are passed to the network and muting is provided. Muting is provided to insure that the no unwanted signals are coupled to the network when the single line instrument is on-hook.

The off-hook detector circuit 56 is provided to detect a change in loop current at point A of the interface transformer 42. The off-hook detector 56 includes an opto coupler 190, a voltage source 192 and an on/off transistor 194. The voltage source 192 comprises an amplifier 193 and current booster transistor 195. The voltage source 192 provides loop voltage to point A. When a change in loop current is detected by opto coupler 190, a loop current detect signal is directed to the control means 52 from the opto coupler 190 along line 196. The base of the on/off transistor 194 is driven by the control means 52 along line 149 such that the opto coupler 190 attempts to detect an off-hook condition only when enabled. In accordance with an important aspect of the present invention, the opto coupler 190 is enabled only during the quiescent portions of the local periodic ring signal as mentioned above.

Figure 4:
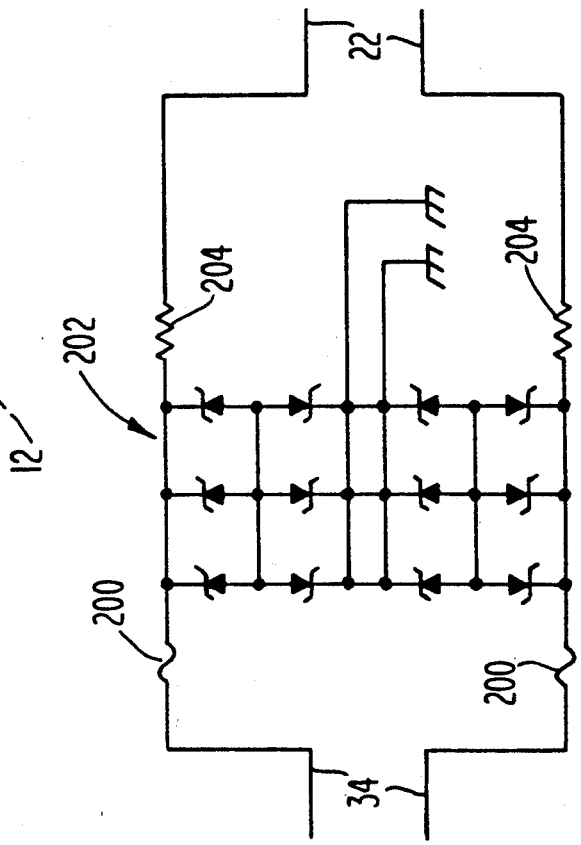
FIG. 4 is a detailed circuit diagram of the shunt diode barrier shown in FIG. 1.

Referring now to FIG. 4, the individual circuit components of the shunt diode barrier 20 will be described. As shown in FIG. 4, the output lines 34 from the telephone line interface unit 18 of FIG. 2 are directed to fuses 200. The fuses 200 are coupled to the reverse polarity zener diode network 202. The center of the zener diode network is connected to earth ground. The zener diode network 202 is coupled to the transmission path 22 by resistors 204.

Overcurrent protection is provided to the zener network 202 by the fuses 200. Voltage protection to the single line instrument is provided by the zener network 202. The zener network limits voltage at the single line instrument to a maximum of ±8.2 volts with respect to earth ground. Current protection is provided by resistors 204 such that overall power to the single line instrument is within the range of regulatory bodies for intrinsic safety. The output of the shunt diode barrier 20 is coupled to the two-wire transmission path 22 as shown.

Figure 5A:
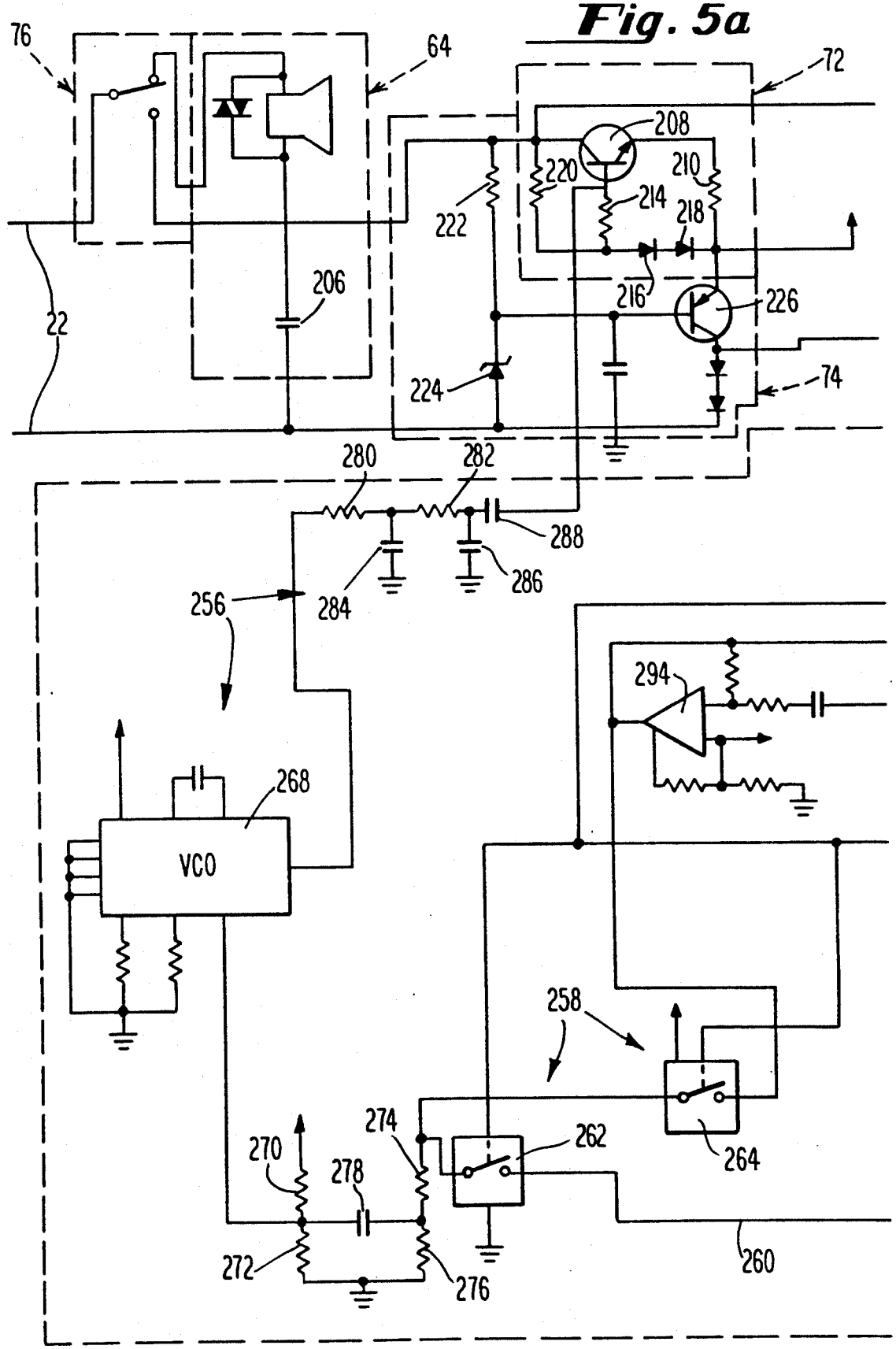
FIGS. 5a and 5b s a detailed block diagram of the single line instrument shown in FIG. 1.
Figure 5B:
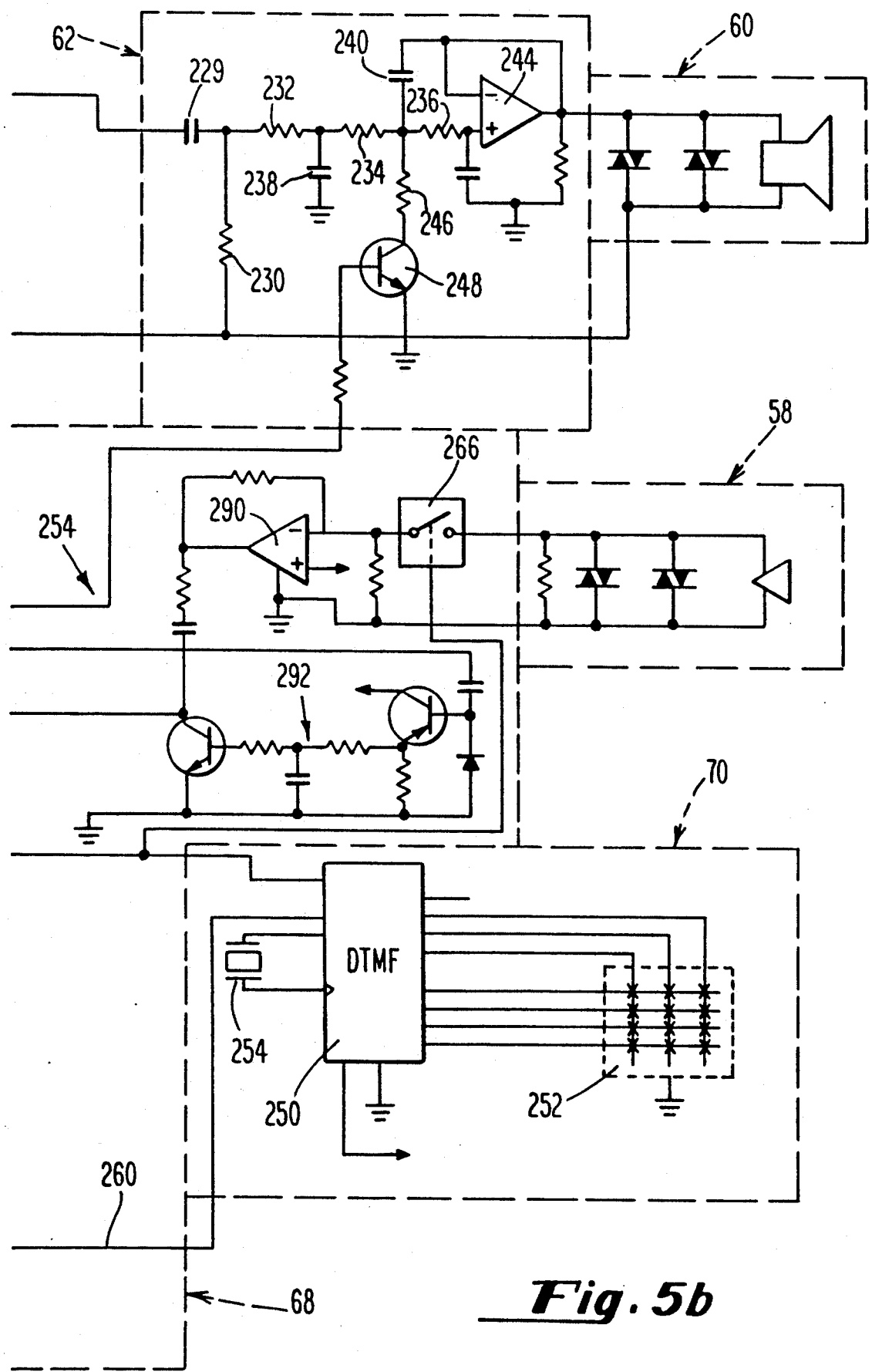

Turning now to FIGS. 5a and 5b, the individual circuit components of the single line instrument 16 of the present invention will be described in further detail.

As shown in FIGS. 5a and 5b, incoming signals to the single line instrument from the shunt diode barrier 20 are directed to the hook switch 76. The hook switch is normally in the on-hook position as shown. When the hook switch is on-hook, incoming ring signals are directed to the piezoelement 64. The piezoelement generates an audible ring indication. The piezoelement 64 is coupled across lines 22 by means of the hook switch 76 and the DC blocking capacitor 206. In accordance with the present invention, the capacitance of the piezoelement may be no less than about 0.1, and in the preferred embodiment no less than about 0.2 micro farads. It has been found that with the device of the present invention, the piezoelement may thus be larger, and therefore, louder than those used previously and yet without compromise of intrinsic safety.

Also coupled across lines 22 is a constant current circuit 72 in series with the voltage regulator 74. The constant current circuit 72 comprises a transistor 208, the collector of which is connected to the hook switch 76 and the emitter of which is connected to a resistor 210. The base of the transistor 208 is coupled to the FM transmitter 68 as will be more fully described below. The base is further connected to a current limiting resistor 214. Diodes 216 and 218 are coupled between resistors 210 and 214 and are provided to regulate the current through resistor 210. Resistor 220 provides bias to the diodes 216 and 218 as well as to the base of the transistor 208.

The voltage regulator 74 comprises resistor 222 and zener diode 224 coupled to the base of a transistor 226. Constant current applied to the emitter of transistor 226 forward biases the base/emitter junction to the voltage across the zener diode 224. The voltage regulator 74 provides a constant voltage to the active circuitry in the single line instrument irrespective of changes in line voltage and load current. The constant current circuit 72, in addition to controlling the current to the voltage regulator 74, also provides a means of modulating the FM carrier from the FM transmitter 68.

When the hook switch 76 is in the off-hook state, incoming signals from the telephone network are directed to the bandpass filter and amplifier 62 that is connected across lines 22. The bandpass filter and amplifier 62 includes a high pass filter 228 comprised of capacitor 229 and resistor 230. The bandpass filter further includes a low pass filter comprised of resistors 232, 234 and 236 and capacitors 238, 240 and 242, all of which provide the input network to amplifier 244. The bandpass filter 62 limits the signal frequency to the audio output transducer 60 to between 300 and 3000 hz. The bandpass filter further includes a muting circuit comprising resistor 246 and transistor 248 controlled by the dialer 70. The muting circuit mutes the audio output transducer 60 during dial signalling.

When a caller desires to place a call using the single line instrument 16, the handset is removed form the cradle (not shown) and the hook switch 76 is moved to the position opposite to that shown in FIGS. 5a and 5b. Dialing inputs to the single line instrument are provided via dialer 70. The dialer 70 comprises a DTMF circuit 250 that includes key pad input 252. The DTMF circuit 250 includes a crystal oscillator 254a coupled thereto for providing a frequency standard to the circuit. The output of the dialer 70 is directed to the FM transmitter circuit 68. While an FM transmitter circuit is disclosed, it should be understood that other modulation techniques could be employed.

The FM transmitter circuit 68 includes two primary portions, an automatic gain control subcircuit, shown generally at 254 and a modulator subcircuit 256. The modulator subcircuit 256 and the gain control subcircuit 254 are connected by switches, shown generally at 258. The switches are provided such that selection may be made between keypad input from the dialer 70 and audio input from the microphone 58.

Dialing inputs from the dialer 70 are fed to the modulator subcircuit 256 on line 260. When the keypad 252 is utilized the DTMF circuit 250 enables switch 262 to direct dialing inputs to the modulator subcircuit 256. At the same time DTMF circuit 250 disables the microphone 58 by controlling the position of switches 264 and 266.

The modulator subcircuit 256 includes a voltage controlled oscillator chip 268, an input circuit comprising resistors 270, 272, 274, and 276 as well as a DC blocking capacitor 278. The modulator subcircuit 256 further includes a band pass filter comprising resistors 280 and 282 and capacitors 284, 286 and 288. The output of the bandpass filter is directed to the constant current circuit 72.

The automatic gain control subcircuit 254 is of a type generally known and is coupled between the microphone 58 and the modulator subcircuit 256. The gain control subcircuit 254 includes an input amplifier circuit 290, a control circuit 292 and an output amplifier 294. The automatic gain control subcircuit 254 maintains a constant audio frequency level output over a wide range of dynamic inputs. In the preferred embodiment the microphone 58 is a noise canceling microphone of the type manufactured by the assignee of the present invention and known as a Model No. 5835-001 microphone. The automatic gain control subcircuit is particularly useful with this microphone.

It has been found that the aforementioned, intrinsically safe, telephone system 10 operates at sufficiently low electrical and thermal energy levels within the hazardous environment 12 so as to meet all of the requirements of the National Electrical Code for use in any class of environment. Moreover, this intrinsically safe telephone is such as not to require either an explosion-proof housing or any auxiliary power supply. Power to the single line instrument 16 within the hazardous environment is provided solely by power transmitted across two wire transmission path 22. Still further, the single line instrument 16 does not require the use of an explosion-proof housing in order to comply with the standards set by NEC and Underwriters Laboratory.

The intrinsically safe telephone described and claimed herein was subjected to various tests by the Underwriters Laboratory. Specifically, the telephone was subjected to a spark ignition test using a hydrogen gas and air mixture using the test mechanism described in Section 33 of UL Standard 913, Third Edition. No ignitions resulted. In addition, the components used in the aforementioned telephone were subjected to thermal ignition tests, thermal runaway tests, current limiting resistor tests, atomized water tests, drip tests, temperature tests and dielectric strength tests, mechanical abuse tests and rain tightness tests, and all such tests were passed satisfactorily.

While a particular embodiment of the present invention has been shown and described it will be apparent that other embodiments are possible without departing from the spirit and scope of the present invention and all such modifications and improvements are within the spirit and scope of the appended claims.

What is claimed is:

1. An intrinsically safe telephone for use in a hazardous environment comprising:
   (a) a single line instrument for providing a dialing output and an audio output signal to a telephone network and for receiving an audio input signal from that network, said single line instrument being situated in said hazardous environment, said single line instrument including a transmitter means for generating a carrier signal, said audio output signal being modulated on said carrier signal;
   (b) a transmission path coupling said single line instrument to a safe environment;
   (c) electrical isolation means situated in said safe environment and coupled between said transmission path and said network for controlling power to said single line instrument, said electrical isolation means including
      (i) a telephone line interface for reducing power to said single line instrument, for reducing the power of incoming ringing signals from the network and for isolating the single line instrument from the network, said telephone line interface including receiver means responsive to said carrier signal for providing a demodulated audio output signal to said network; a sidetone network responsive to said demodulated audio output signal for providing a phase adjusted feedback signal over said transmission path to said single line instrument; an off-hook detector responsive to changes in loop current in said transmission path; a network interface responsive to a ringing input signal form the network, said ringing input signal having a defined ring interval; a ring generator for applying a local periodic ring signal to the transmission path during that interval, said local periodic ring signal including active portions interrupted by relatively quiescent portions over each period; and control means responsive to the off-hook detector for generating an off-hook signal when a change in loop current has been detected only during the quiescent portions of said periodic ring signal or when a change in loop current has been detected and no ringing input signal has been detected by the network interface, said ring signal generator being responsive to said off-hook signal;
      (ii) a shunt diode barrier for controlling the maximum power to the single line instrument; and
   (d) a local power interface coupled to said telephone line interface for supplying power to said telephone line interface from a source other than said telephone network.

2. An intrinsically safe telephone for use in a hazardous environment comprising:
   (a) a single line instrument for providing a dialing output and an audio output signal to a telephone network and for receiving an audio input signal from that network, said single line instrument being situated in said hazardous environment;
   (b) a transmission path coupling said single line to a safe environment;
   (c) electrical isolation means situated in said safe environment and coupled between said transmission path and said network for controlling power to said single line instrument, said electrical isolation means including
      (i) a telephone line interface for reducing power to said single line instrument, for reducing the power of incoming ringing signals from the network and for isolating the single line instrument from the network, said telephone line interface further including
      an off-hook detector responsive to changes in loop current in said transmission path;
      a network interface responsive to a ringing input signal from the network, said ringing input signal having a defined ring interval;
      a ring generator for applying a local periodic ring signal to the transmission path during that ring interval, said local periodic ring signal including active portions interrupted by relatively quiescent portions over each period; and
      control means responsive to the off-hook detector for generating an off-hook signal either when a change in loop current has been detected only during the quiescent portions of said periodic ring signal or when a change in loop current has been detected and no ringing input signal has been detected by the network interface, said ring generator being responsive to said off-hook signal; and
      (ii) a shunt diode barrier for controlling the maximum power to the single line instrument.

3. An intrinsically safe telephone according to claim 2 further comprising:
   (d) a local power interface coupled to said telephone line interface for supplying power to said telephone line interface and to said single line instrument.

4. An intrinsically safe telephone according to claim 2 wherein said single line instrument includes a piezoelement for generating an audible ring indication, the capacitance of said piezoelement being no less than about 0.1 microfarads and yet wherein the overall capacitance of said single line instrument does not preclude intrinsic safety.

5. An intrinsically safe telephone according to claim 4 wherein the capacitance of said piezoelement is no less than about 0.2 micro farads.

6. An intrinsically safe telephone for use in a hazardous environment comprising:
   (a) a single line instrument for providing a dialing output signal and an audio output signal to a telephone network, said single line instrument being situated in said hazardous environment;
   (b) a transmission path, having separate receive and transmit audio paths, coupling said single line instrument to a safe environment;
   (c) electrical isolation means situated in a safe environment and coupled between said transmission path and said network for controlling power to said single line instrument, said electrical isolation means including
      (i) a telephone line interface for reducing power to said single line instrument, for reducing the power of incoming ringing signals from the network and for isolating the single line instrument from the network, said telephone line interface including a sidetone network responsive to said audio output signal for providing a phase adjusted feedback signal over said transmission path to said single line instrument, and;
      (ii) a shunt diode barrier for controlling the maximum power to the single line instrument.

7. An intrinsically safe telephone according to claim 6 in which said transmission path is a two wire physical pair of conductors.

8. An intrinsically safe telephone according to claims 6 or 7 in which said single line instrument includes
   (i) transmitter means for generating a carrier signal for transmission over said transmission path, said audio output signal being modulated on said carrier signal; and in which said telephone line interface includes
   (ii) receiver means responsive to said carrier signal for providing a demodulated audio output signal to said network.

9. An intrinsically safe telephone according to claim 8 in which said transmitter means is an FM transmitter and said audio output is frequency modulated on said carrier.

10. An intrinsically safe telephone according to claim 6 in which said telephone line interface further includes
    (i) an off-hook detector responsive to changes in loop current in said transmission path;
    (ii) a network interface responsive to a ringing input signal from the network, said ringing input signal having a defined ring interval;
    (iii) a ring generator for applying a local periodic ring signal to the transmission path during that ring interval, said local periodic ring signal including active portions interrupted by relatively quiescent portions over each period; and
    (iv) control means responsive to the off-hook detector for generating an off-hook signal whenever a change in loop current has been detected during the quiescent portions of said periodic ring signal or a change in loop current has been detected and no ringing input signal has been detected by the network interface, said ring generator being responsive to said off-hook signal.

11. An intrinsically safe telephone according to claim 6 further comprising:
    (d) a local power interface coupled to said telephone line interface for supplying power to said telephone line interface and to said single line instrument.

12. An intrinsically safe telephone according to claim 6 wherein said single line instrument includes a piezoelement for generating an audible ring indication, the capacitance of said piezoelement being no less than about 0.1 microfarads and yet wherein the overall capacitance of said single line instrument does not preclude intrinsic safety.

13. An intrinsically safe telephone according to claim 12 wherein the capacitance of said piezoelement is no less than about 0.2 micro farads.

* * * * *